United States Patent [19]
Leichter et al.

[11] Patent Number: 5,972,506
[45] Date of Patent: Oct. 26, 1999

[54] INTERCALATION COMPOUNDS, METHOD FOR PREPARING THEM AND USE THEREOF, PARTICULARLY IN PYROTECHNICS

[75] Inventors: Geneviève Leichter, Pibrac; Jean-Claude Gachon, Seichamps; Daniel Guerard, Malzeville, all of France

[73] Assignee: Etienne LaCroix Tous Artifices S.A., France

[21] Appl. No.: 08/945,831

[22] PCT Filed: May 6, 1996

[86] PCT No.: PCT/FR96/00687

§ 371 Date: Jan. 2, 1998

§ 102(e) Date: Jan. 2, 1998

[87] PCT Pub. No.: WO96/34825

PCT Pub. Date: Nov. 7, 1996

[30] Foreign Application Priority Data

May 6, 1995 [FR] France ................................. 95 05398

[51] Int. Cl.⁶ ................................. B32B 5/16; C01D 13/00
[52] U.S. Cl. ...................... 428/402; 252/506; 252/519.1; 252/519.33; 252/521.5; 423/119; 423/206.1; 423/445 R; 423/448; 428/704
[58] Field of Search ...................... 428/402, 408, 428/704; 423/414, 119, 206.1, 445 R, 448; 252/502, 506, 519.33, 519.1, 521.5

[56] References Cited

U.S. PATENT DOCUMENTS

| | | | |
|---|---|---|---|
| 4,293,450 | 10/1981 | Vogel | 252/503 |
| 4,414,142 | 11/1983 | Vogel et al. | 252/506 |
| 4,515,709 | 5/1985 | Watanabe et al. | 252/509 |
| 4,565,649 | 1/1986 | Vogel | 252/503 |
| 4,634,546 | 1/1987 | Kalnin et al. | 252/506 |
| 4,642,201 | 1/1987 | Vogel | 252/503 |
| 4,645,620 | 2/1987 | Palchan et al. | 252/502 |
| 4,704,231 | 11/1987 | Chung | 252/511 |
| 4,749,514 | 6/1988 | Murakami et al. | 252/500 |
| 4,756,778 | 7/1988 | Deitz et al. | 149/108.2 |
| 4,795,591 | 1/1989 | Fujimoto et al. | 252/506 |
| 5,059,409 | 10/1991 | Hung | 423/448 |
| 5,130,199 | 7/1992 | Howard | 428/408 |
| 5,149,518 | 9/1992 | Mercuri et al. | 423/449 |
| 5,254,409 | 10/1993 | Yagi et al. | 428/392 |
| 5,846,459 | 12/1998 | Mercuri | 264/42 |

OTHER PUBLICATIONS (Billaud et al., 1980) "The Synthesis and Resistivity of the Ternary Graphite–K–Na Compounds". *Materials Science and Engineering*, 45: 55–59.

(Billaud et al., 1981) "The Synthesis and Resistivity as a Function of Composition and Stage for Some Ternary Intercalation Compounds". *Synthetic Metals*. 3: 279–288.

(Basu et al., 1979) "Synthesis and Properties of Lithium–Graphite Intercalation Compounds". *Materials Science and Engineering*. 38: 275–283.

(Hark et al., 1985) "Structure and synthesis of the ternary alkali graphite intercalation compound $KcsC_{16}$ an ideal layered heterostructure". *J. Chem. Phys.* 82: 921–926.

*Primary Examiner*—Hoa T. Le
*Attorney, Agent, or Firm*—Rockey, Milnamow & Katz

[57] ABSTRACT

An intercalation compound of general formula $Na_xK_{1-x}Z_y$, wherein Z is a carbon or a polymer with a cyclic, particularly aromatic unit, as base unit; $0<x<1$; and $2 \leq y \leq 6$. A method for preparing the compound is also described, as well as the use thereof, particularly in pyrotechnics and in lithium batteries.

18 Claims, 1 Drawing Sheet

INTERCALATION COMPOUNDS, METHOD FOR PREPARING THEM AND USE THEREOF, PARTICULARLY IN PYROTECHNICS

FIELD OF THE INVENTION

The subject of the invention is new intercalation compounds. The invention is also targeted at a process for the preparation thereof and at the use thereof, in particular in pyrotechnics.

BACKGROUND OF THE INVENTION

It is known to prepare materials capable of generating a sufficient amount of heat on contact with air to be able to be used in pyrotechnics. These materials are generally provided in a pulverulent form and are in particular inorganic compounds.

Among inorganic compounds, alloys and inter-metallic compounds can a priori offer good prospects. Calcium-based alloys are advantageous, for example: they are hard, brittle, can easily be detrimentally affected by water and exhibit exploitable melting temperatures. By way of illustration, the melting temperature of $Ca_2Sn$ is 1120° C. and that of $CaSn_3$ is 627° C.

Mention may also be made of calcium-magnesium alloys MgCa or $Mg_2Ca$ for which the melting temperatures are 517 and 714° C. respectively. Mention may further be made of calcium-zinc alloys, for example ZnCa for which the melting temperature is 385° C.

The enthalpies of reaction ($\Delta H$) are as follows, assuming that the oxides are formed according to a reaction of the type $$M_A + M_B + \frac{y+z}{2}O_2 \rightarrow M_AO_y + M_BO_z$$

|  | $\frac{y+z}{2}$ | $\Delta H$ (kcal · mol$^{-1}$) |
|---|---|---|
| $Ca_2Sn$ | 2 | −442 |
| $CaSn_3$ | 3.5 | −568 |
| $Mg_2Ca$ | 1.5 | −449 |
| MgCa | 1 | −300 |
| ZnCa | 1 | −235 |

Alloys based on sodium and on potassium have been widely studied for possible pyrotechnic applications. It has thus been possible to demonstrate that some of these alloys, for example the sodium-potassium alloy containing 50–80% by mass of potassium, may be potentially advantageous in pyrotechnics. This is because some of them react in the presence of oxygen or of water with a strong release of heat.

As regards the intermetallic compounds formed with sodium or potassium, their reaction with air is less violent that when Na or K are alone, which is per se a positive point.

Titanium forms a great many binary or ternary alloys with most of the elements of the periodic classification (nouveau traité de Chimie Minérale [New Treatise on Inorganic Chemistry], Paul Pascal, Masson).

Metallic titanium has the property of spontaneously oxidizing in the presence of oxygen, releasing a large amount of heat.

Moreover, much work has been carried out into the study of coruscative materials (this concerns intermetallic combined materials, that is to say that, after having reached the reaction temperature, these products are capable of releasing large amounts of energy).

Mention may be made, for example, of:

| Material | % by weight | Ignition temperature (°C.) | Reaction temperature (°C.) | Enthalpy measured (J.g$^{-1}$) |
|---|---|---|---|---|
| Ti Sb Pb | 48 23 29 | 570 | 1010 | 1045 |
| Ti Te | 27 73 | 433 | 870 | 815 |

Patents WO 089/10340 and U.S. Pat. No. 4,830,931 relate to processes for the activations of metal surfaces in order to render them pyrophoric.

The basic principle is the attack on the metal surface by a mixture of a metal and of its chloride, at a temperature such that the substrate remains in the solid state and that the mixture is in the liquid state. The reaction is long, since it lasts several tens of hours.

The metal, thus covered with an intermetallic layer, is subsequently activated by a sodium hydroxide solution.

The metal which has become pyrophoric must then be stored in a liquid of low volatility (examples: fluoroethane, nonane, glycerol).

However, it is expensive to prepare these compounds and the latter can thus be exploited industrially only to a fairly limited extent.

Compounds which have formed the subject of other studies in this field are metal pairs which are in a position, when the reaction temperature is reached, to release relatively large amounts of energy with the formation of an alloy.

It is thus necessary to transmit a sufficient amount of energy to these materials in order for the melting temperature of one of the metals of the pair to be reached and for the reaction to take place.

Explosive charges are generally used.

The exothermic reaction is brief.

However, these compounds are also expensive and, for this reason, can also be exploited industrially only to a limited extent.

Lithium-based alloys are also well known. Their high reactivity in the presence of moist air, for example, is known and is profusely described by J. C. Bailar, in "Comprehensive Inorganic Chemistry", Volume 1, 1973, 335–37, F. A. Cotton and G. Wilkinson, in "Advanced Inorganic Chemistry", 1972, 189–91 and F. E. Wang and M. A. Mitchell, in "J. Less Common Metals", 1978, 61, 237.

It is noted that organometallic compounds are often far removed from pyrotechnic applications. This is because they often exhibit the disadvantage of reacting violently in the presence of water. Now, the water content in air depends essentially on the weather conditions. It is therefore very clearly understood that the result of bringing these compounds into contact with air is uncertain and that, for this reason, these compounds are rather far removed from pyrotechnic applications.

In reality, in this field, there is interest in particular in compounds which give rise to reactions involving atmospheric oxygen (optionally nitrogen), in order for the product to retain an equivalent performance whatever the surrounding conditions.

It is a question of generating heat in the atmosphere by distributing therein a pulverulent product capable of spontaneously oxidizing. More specifically, it is a question of heating a volume of air (typically 1000 m³) while avoiding an excessively high temperature peak (so-called "thermal peak").

In this respect, tests have shown that the majority of the inorganic compounds indicated above exhibit in particular the following disadvantages:

their duration of combustion is too brief, the temperature reached is too high.

In addition, these compounds can be improved from the viewpoint of their intrinsic properties, for example their toxicity. Moreover, it would also be desirable to have better control over all the values related to their reaction with air, namely the energies and the durations of this reaction.

From a practical viewpoint, it would also be appropriate to develop a process for the manufacture of such compounds which is simpler and faster than those which currently exist.

Some intercalation compounds of graphite, namely those of heavy alkali metals, have been known since 1926 [K. Fredenhagen and G. Cadenbach, Z. anorg. allgem. Chemie (1926) 158].

Finally, the description of the state of the art can be completed by the citation of the document U.S. Pat. No. 3,160,670, which teaches the use of $KC_8$ as a catalyst for chemical reactions.

SUMMARY OF THE INVENTION

The aim of the invention is to provide a compound which exhibits the following properties:

it reacts instantaneously with air, that is to say in less than 0.5 second, its duration of combustion with air is greater than 5 seconds, its calorific value is high, its resistance to ageing is good, it is nontoxic, it is prepared by means of a process which can be readily industrialized, its cost is moderate, it does not give rise to a violent reaction when it is immersed in water.

This is achieved according to the invention by preparing an intercalation compound of overall formula I:

$$Na_xK_{1-x}Z_y \quad (I)$$

in which:

Z represents carbon or a polymer with a cyclic unit, in particular an aromatic unit, especially a polymer in which the basic unit is $C_6H_4$;

$$0 < x < 1,$$

and $$2 \leq y \leq 6,$$

y being able to be an integer or a noninteger.

The invention more particularly relates to the compounds of formula I in which Z represents carbon.

A priori, the presence of alkali metals allows an instantaneous reaction of these compounds with air to be predicted; the fact that these compounds are rich in carbon gives a good probability of an exothermic reaction which will last over time.

The products of reaction with air can be Na, K and their oxides and C, CO, $CO_2$ and CH or $CH_2$ forms.

Moreover, these compounds are nontoxic and can be easily industrialized. They react spontaneously in the presence of atmospheric oxygen or of the oxygen of certain organic compounds, releasing a high heat of reaction.

The invention, more particularly still, relates to the intercalation compounds of formula I in which $$0.15 \leq x \leq 0.70.$$

Such compounds can, for example, be prepared from a mixture of sodium and of potassium at a temperature in the region of 20° C.

Preferably y is chosen such that:

$$3 \leq y 5.$$

Amounts of sodium and of potassium will advantageously be chosen, for these compounds, which correspond to:

$$0.25 \leq x \leq 0.45.$$

Such compounds are obtained by mixing sodium and potassium in the vicinity of 0° C., for example.

More advantageously, a value of x is chosen which corresponds to a value close to the eutectic in the Na—K phase diagram.

BRIEF DESCRIPTION OF THE FIGURES

The Na—K phase diagram is represented in

From this diagram, it can in particular be deduced that the eutectic exhibits an empirical formula which is approximately written $Na_{0.32}K_{0.68}$. In other words, the composition at the eutectic corresponds to x=0.32 approximately.

The color of these compounds can vary, depending on the stages of intercalation of the sodium and of the potassium in the carbon, between yellow, brown, blue or black with, in some cases, a metallic sheen.

DETAILED DESCRIPTION OF THE PREFERRED EMBODIMENTS

The carbon is advantageously provided in the form of particles with a particle size of between $10^{-5}$ and 1 mm.

The performances of these products, which are particularly advantageous in pyrotechnics, are in particular related to their high calorific potential (between 4000 and 8000 $J.g^{-1}$); and to their duration of radiance entirely suited to this type of application (greater than 10 seconds).

The process for the preparation of an intercalation compound I according to the invention comprises:

a stage of degassing the carbonaceous source Z, in particular carbon, a stage of formation of an $Na_xK_{1-x}$ liquid alloy by bringing Na and K metals, in solid form, into contact at an appropriate temperature dictated by the Na—K phase diagram, in particular at room temperature, and under an inert atmosphere, and a stage of bringing the degassed carbonaceous source Z, in particular degassed carbon, into contact with the $Na_xK_{1-x}$ liquid alloy, preferably with stirring, in order to obtain $Na_xK_{1-x}$, in particular $Na_xK_{1-x}C_y$, under an inert atmosphere and without any external contribution of heat.

Figure 1A:
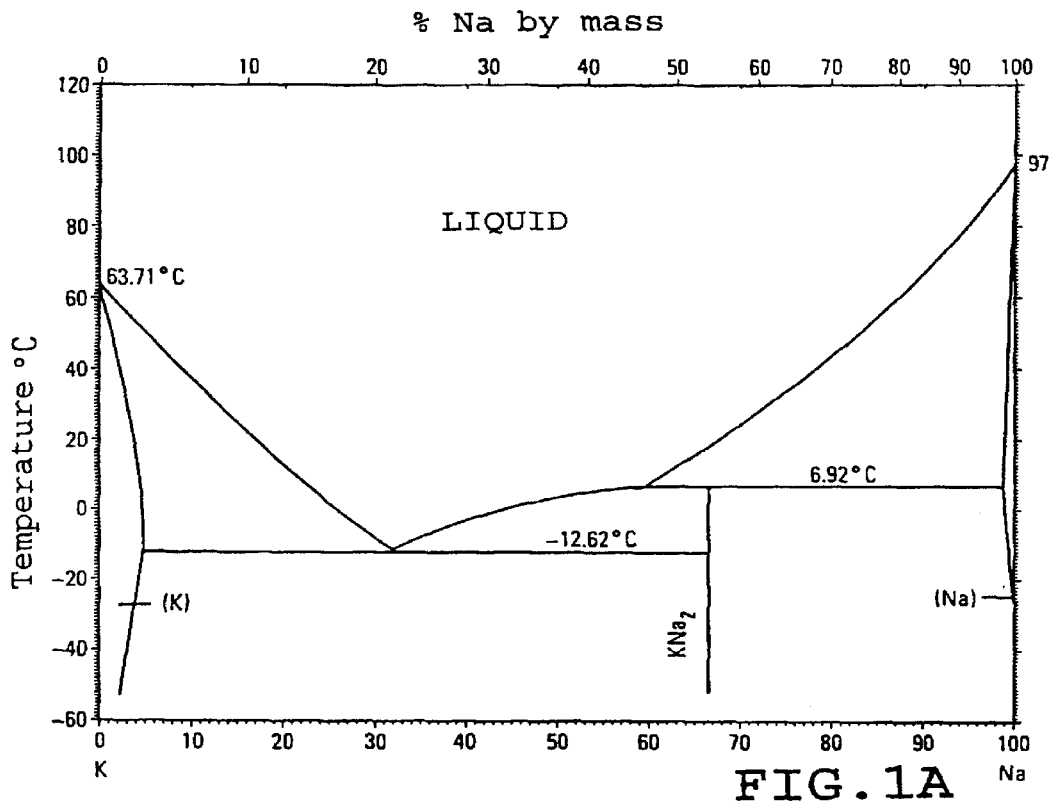
FIGS. 1A and 1B. It is extracted from the work entitled "Binary Alloy Phase Diagrams", 2nd Ed., Vol. 3, Ed. Thaddeus B. Massalski.
Figure 1B:
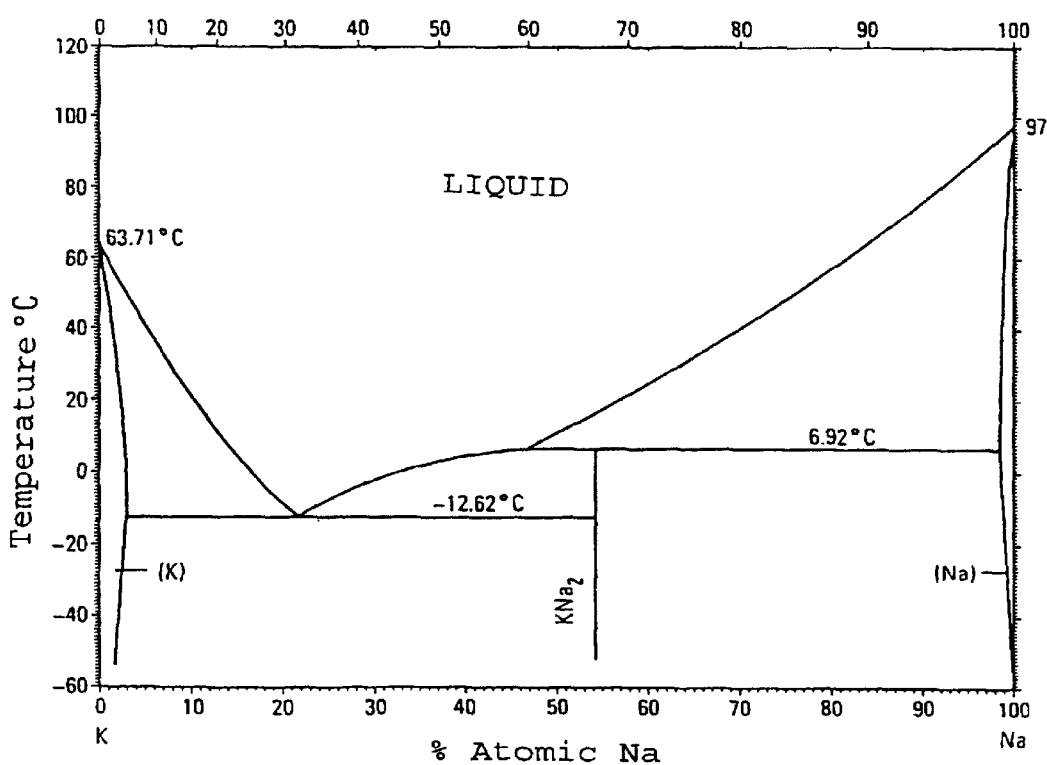

It is thus suitable for obtaining a liquid alloy based on sodium and on potassium at a chosen temperature. For this, reference is in practice made to the Na—K phase diagram, for example that reproduced in FIG. 1. The sodium and the potassium are employed, for the chosen temperature, at a concentration such that they form a liquid compound.

The percentage of sodium to be employed in the Na—K mixture in order to obtain a liquid mixture has been collated, by way of information, in Table 1 below. The percentages are given only approximately.

TABLE 1

| Temperature (°C.) | Percentage of Na |
|---|---|
| 15° C. | 21 to 64 |
| 18° C. | 18 to 60 |
| 40° C. | 9 to 79 |
| 64° C. | 0 to 90 |

The reaction takes place instantaneously or after a few hours, depending on the nature of Z and depending on the stoichiometry chosen, namely the values of x and of y.

Measurements carried out on appropriate devices have shown that these intercalation compounds exhibit a calorific potential of between 4000 and 8000 $J.g^{-1}$ at a duration of radiance of greater than 10 seconds.

In order to disperse these intercalation compounds in air, use is made of a bursting charge such that the dispersion of the material is instantaneous. It is also possible to use a gas generator which drives the movement of a piston which ejects the material gradually over a trajectory or alternatively to generate the material continuously from a container supplied under overpressurized conditions.

It is possible to choose to form an $Na_xK_{1-x}$ liquid alloy which corresponds to the eutectic. In this eventuality, the alkali metals Na and K used for the formation of the eutectic can be provided in the form of solid pieces suspended in a mineral or organic oil, the ratio by weight of Na and of K to the oil being less than 50%, generally between 3 and 20%.

If it is desired to form the eutectic, the reaction is carried out by simply bringing solid potassium and solid sodium into contact under an inert atmosphere. The carbon, for example originating from vegetable charcoal, is degassed separately at the same time and then the alloy can be poured over the degassed charcoal. The combined mixture is stirred mechanically; the reaction is very fast and its exothermicity is sufficient to make possible good homogenization of the compound.

In this case, the ratio of the carbon with respect to the composition of the Na and K eutectic can be adjusted within fairly wide limits until a compound is obtained formed by sodium and potassium in a stoichiometry in the region of that of the eutectic compound, the stoichiometry of the carbon being such that y is in the region of 2. This latter compound furthermore still behaves as a solid compound, even if each particle is surrounded by a film of Na and of K in the composition of the eutectic, this film being capable of liquefying under the effect of a high pressure.

Preferably, the carbon used is provided in the form of granules with a diameter of between 1 and 4 mm and preferably of between 2 and 3 mm.

According to one advantageous embodiment of the process according to the invention, the stage of bringing degassed carbon into contact with the $Na_xK_{1-x}$ liquid alloy is carried out by pouring said liquid alloy over the degassed carbon.

The preparation process according to the invention is without doubt the simplest which it is possible to envisage.

It has made it possible, for example, to obtain an amount of approximately 400 g of compound in a single step, whereas the amounts of intercalation compounds originating from harder methods are only of the order of a few grams. The compounds prepared are suitable for industry and exhibit a very acceptable causticity: in a volume of 1000 $m^3$, the level of hydroxides remains well below the tolerated threshold.

The intercalation compounds of general formula I can be used as constituent of a pyrotechnic composition.

They can advantageously be used for heating specific areas, such as landing strips or sensitive parts of production plants, or for protecting crops from frost.

Moreover, the intercalation compounds of general formula I can be used for the purification of inert gases.

For this, the compounds of formula I are simply placed in a cartridge on the gas line and the impurities contained in the gases are thus trapped by these compounds according to the invention.

It has also been found that this intercalation compound can be used as precursor of lithium battery electrode material.

The functioning of lithium batteries is described, in particular, in the work Handbook of Batteries, D. Linden Editor, John Whey & Sons, New York (1985).

Influence of Various Parameters on the Qualities of the Intercalation Compounds

1. Nature and Particle Size of the Carbon

Measurements carried out on KC8 with carbons of various origins reveal the contribution of the nature and of the particle size of the carbon to the performance of the product:

TABLE 2

| Type of carbon/particle size | Heat of the reaction ($J.g^{-1}$) |
|---|---|
| Gas black/ 13 nm | 4200 |
| Fine wood charcoal | 2500 |
| Graphite /< 5 μm | 2500 |
| Graphite/2 μm | 2000 |

It is observed that the heat of the reaction of these compounds with air is generally markedly greater than the theoretical heat obtained for $KC_8$, namely 2030 $J.g^{-1}$.

2. Nature of the Alkali Metals

In the process, it is particularly advantageous to operate with respect to a NaK eutectic mixture because the latter is liquid at room temperature.

Moreover, the alkali metals can be supplied in two forms, namely pure alkali metals or alternatively alkali metals packaged in oil.

Consequently, two new parameters are involved with respect to the quality of the intercalation compounds, on the one hand, and with respect to the duration of the process, on the other hand. It concerns the Na and K relative percentages about the eutectic point and the level of oil which influence the performance of the final material.

a) Sodium-potassium relative percentages. The tests carried out about the eutectic point have shown that enrichment with sodium is slightly favorable to the heat-generating aspect but that it greatly accelerates the oxidation kinetics, whereas enrichment with potassium slightly reduces heat generation and gives stickier powders. The eutectic alloy thus remains that which offers the best compromise.

b) Influence of the level of oil. It appears that the increase in the level of oil tends to increase the duration of combustion. Thus, when the masses of oil and of active product are equivalent, visible combustion no longer occurs but the flakes warm up gently.

However, it should be noted that a significant level of oil makes the material sticky, which is incompatible with good dispersion.

The influence of the level of oil varies with the nature of the carbon used.

3. Influential Parameters

The final choice of the product must take into account various requirements. The components of the choice will be found in the following table.

The influential parameters for a specific targeted property and the values which it is desirable to give to these parameters, depending on the situation, are collated below.

TABLE 3

| TARGETED PROPERTY | INFLUENTIAL PARAMETERS | CHOICE |
|---|---|---|
| Duration of the reaction | • Level of oil | • ≦40% |
|  | • NaK relative % | • 22% of Na |
|  | • Particle size of the C | • Rather coarse |
| Instantaneity of the reaction | • Intrinsic | • $KC_z$ or $NaKC_z$ |
| Calorific potential | • Stoichiometry | • ≦ $KC_4$ (or $NaKC_4$) |
|  | • Particle size of the C | • Fine |
| Low temperature cloud | • Intrinsic | • $KC_z$ or $NaKC_z$ |
| Nontoxicity | • Intrinsic | • $KC_z$ or $NaKC_z$ |
| Density and return to the initial state | • Particle size of the carbon | • Very fine |
|  | • Stoichiometry | • $NaKC_4$ – $NaKC_6$ |
|  | • Level of oil (depending on the type of carbon) |  |
| Dispersibility | • Stoichiometry | • > $NaKC_z$ |
|  | • Particle size of the carbon | • Coarse |
|  | • Level of oil | • <5% |
| Resistance to ageing | • Level of oil | • <30% |
|  | Stoichiometry | • ≧ $NaKC_4$ |
| Raw material cost | • Alkali metals under oil | • Alkali metals under oil |
| Simple manufacture | • NaK mixture about the eutectic point | • ≃ Eutectic point |

In this table, "NaK" must be understood as a simplified way of writing $Na_{0.32}K_{0.68}$.

The invention may be better understood using the following nonlimiting examples which constitute preferred embodiments of the compound according to the invention.

EXAMPLES

Example 1

Heat Emitted by Various $Na_{0.324}K_{0.676}C_z$ Compounds

Various compounds of $NaKC_z$ type are prepared by using the process according to the invention.

The calorific potential is determined for each compound. The calorific potentials are collated in the list below:

$Na_{324}K_{0.676}C_2$ (Sobrep®) 6400 J.g$^{-1}$
$Na_{324}K_{0.676}C_4$ (Carbon Lorraine® Graphite) 4600 J.g$^{-1}$
$Na_{324}K_{0.676}C_6$ (Graphite, 10 µm) 4000 J.g$^{-1}$
$Na_{324}K_{0.676}C_4$ (Gas black) 4600 J.g$^{-1}$
$Na_{324}K_{0.676}C_2$ (Wood charcoal) 6400 J.g$^{-1}$ (up to 8000 J.g$^{-1}$).

The carbon used to prepare each of the compounds has been shown between brackets in this list.

It is observed that the heat emitted by the combustion of these various compounds is of the order of 4000 to 8000 J.g$^{-1}$. These values are thus well within the desired range for compounds intended for pyrotechnic applications.

Example 2

Physical Properties of $C_6H_4$-based Polymer Intercalation Compounds.

A $C_6H_4$-based polymer intercalation compound is prepared. Its basic unit is written:

$$C_6H_4-CH_2-C_6H_4.$$

In short, it concerns two benzene rings connected to one another by a methyl group.

Sodium and potassium are intercalated in said polymer, preferably in proportions in the region of the eutectic.

Certain physical properties of the compounds obtained are measured. These measurements are carried out for variable amounts of compounds. The mean value of the calorific potential is of the order to 2800 J/g.

It is found that the intercalation compound in accordance with the invention exhibits excellent calorific properties which can be widely exploited in pyrotechnics.

We claim:

1. Intercalation compound of the formula I:

$$Na_xK_{1-x}Z_y \qquad (I)$$

in which:

Z represents carbon or a polymer with a cyclic unit;

$$0<x<1,$$

and $$2 \leq y \leq 6.$$

2. Compound according to claim 1, where Z represents carbon.

3. Compound according to claim 1 where:

$$0.15 \leq x \leq 0.70.$$

4. Compound according to claim 1 where $$3 \leq y \leq 5.$$

5. Compound according to claim 4, where $$0.25 \leq x \leq 0.45.$$

6. Compound according to claim 5, where x corresponds to a value close to the eutectic in the Na—K phase diagram.

7. Compound according to one of claim 1 where the carbon is provided in the form of particles with a particle size of between 10$^{-5}$ and 1 mm.

8. Compound according to claim 1 wherein the polymer with a cyclic unit is an aromatic polymer unit in which the base unit is $C_6H_4$.

9. A pyrotechnic composition comprising a compound of claim 1.

10. Process for the preparation of an intercalation compound according to claim 1 that comprises:

a) a stage of degassing the carbonaceous source Z, b) a stage of formation of an $Na_xK_{1-x}$ liquid alloy by bringing Na and K metals, in solid form, into contact at an appropriate temperature dictated by the Na-K phase diagram, and c) a stage of bringing the degassed carbonaceous source Z, into contact with the $Na_xK_{1-x}$ liquid alloy, preferably with stirring, in order to obtain $Na_xK_{1-x}Z_y$.

11. A process according to claim 10 in which the carbonaceous source is carbon.

12. Process according to claim 11, the carbon used is provided in the form of granules with a diameter of between 1 and 4 mm.

13. Process according to claim 11 where the stage of bringing the degassed carbon into contact with the $Na_xK_{1-x}$ liquid alloy is carried out by pouring said liquid alloy over the degassed carbon.

14. A process according to claim 10 in the temperature is room temperature and the formation is under an inert atmosphere.

15. A process according to claim 10 in which step c) occurs under an inert atmosphere and without any external contribution of heat.

16. A method of heating specific areas comprising applying a compound of claim 1 to such areas.

17. A method of purifying inert gases comprising exposing impurities in said gases to a compound of claim 1.

18. A method of preparing lithium battery electrode materials comprising using a compound of claim 1 as a precursor of such materials.

* * * * *